Figure 1:
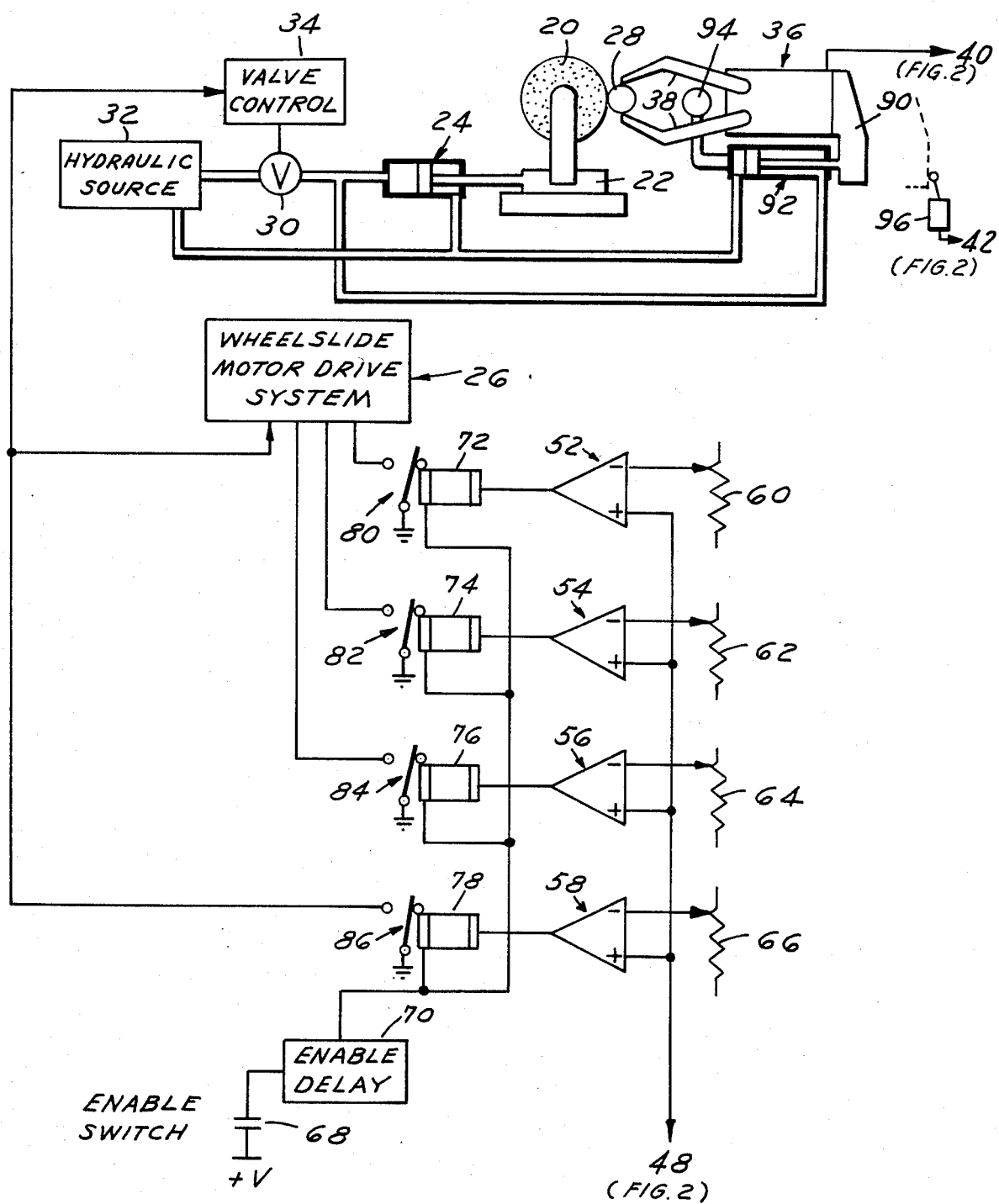

United States Patent [19]

Brown et al.

[11] Patent Number: 4,539,777
[45] Date of Patent: Sep. 10, 1985

[54] MACHINING IN-PROCESS GAGE CALIBRATION FROM REFERENCE MASTER

[75] Inventors: Bernard J. Brown, Ann Arbor; Thomas B. Peelle, South Lyon, both of Mich.

[73] Assignee: Control Gaging, Inc., Ann Arbor, Mich.

[21] Appl. No.: 557,523

[22] Filed: Dec. 2, 1983

[51] Int. Cl.³ .............................................. B24B 49/06
[52] U.S. Cl. ............................... 51/165 R; 51/165.91; 51/165.73; 51/281 R; 51/322; 33/143 L; 33/148 H; 33/178 E
[58] Field of Search ............ 33/149 J, 148 H, 178 E; 51/165 R, 165.91, 281 R, 322, 165.73

[56] References Cited

U.S. PATENT DOCUMENTS

| | | | |
|---|---|---|---|
| 2,477,085 | 7/1949 | Rieber | 33/148 H |
| 3,828,439 | 8/1974 | Ishikawa | 33/178 E |
| 3,921,300 | 11/1975 | Cox | 33/178 E |
| 4,238,886 | 12/1980 | Brown | 33/143 L |

FOREIGN PATENT DOCUMENTS

| | | | |
|---|---|---|---|
| 22659 | 2/1983 | Japan | 51/165 R |
| 863169 | 3/1961 | United Kingdom | 33/148 H |

*Primary Examiner*—Harold D. Whitehead
*Attorney, Agent, or Firm*—Barnes, Kisselle, Raisch, Choate, Whittemore & Hulbert

[57] ABSTRACT

A system and method for controlling operation of a machine tool such as a grinder wherein engagement of the machine tool with a workpiece is controlled in real time by a workpiece measurement signal from a gage likewise engaged with the workpiece. The measurement gage is periodically brought into measuring engagement with a gage master having a predetermined master dimension relative to the desired machined size of the workpiece. The resulting gage master measurement signal is compared with a reference, and a compensation signal is generated and stored as a function of the magnitude and polarity of any departure from the gage master measurement signal from the gage master reference signal. Thereafter, during the machining mode of operation, motion of the machine tool is controlled as a combined function of the workpiece measurement signal and the compensation signal generated and stored during the calibration mode of operation.

18 Claims, 4 Drawing Figures

MACHINING IN-PROCESS GAGE CALIBRATION FROM REFERENCE MASTER

The present invention is directed to machining operations wherein motion of a machine tool is controlled in real time by a measurement gage which engages the machined workpiece, and more particularly to a method and system for in-process calibration of the measurement gage from a gage master reference.

Real time control of a machine tool in a machining operation by a measurement gage in engagement with the workpiece is conventional in the art. For example, U.S. Pat. No. 4,238,886 discloses a system and method for controlling motion of a grinding wheel using the output of a gage having a pair of caliper arms which engage and measure the ground dimensions of the workpiece. While the technique disclosed in the aforementioned patent has enjoyed commercial success, some problems have arisen due to wear on those portions of the gage arms which engage the workpiece and due to temperature variations of the gage control circuitry.

A general object of the present invention is to provide a system and method for continuous real time control of machine tool motion which overcome the aforementioned problems by automatically compensating the measurement gage control signal for gage wear and circuit temperature variations.

In furtherance of the foregoing, another and more specific object of the invention is to provide a system and method for controlling motion of a machine tool as a continuous real time function of workpiece dimension wherein the workpiece measurement gage is periodically positioned in a first mode of operation to engage a gage master having a predetermined dimensional relationship to the desired machined workpiece dimension, and wherein the gage output obtained during such first mode of operation is stored and later utilized to compensate the gage output during the actual machining mode of operation.

Yet another object of the invention is to provide a system and method of the described type which are economical to implement and reliable in long-term operation.

A further object of the invention is to provide a system and method of the described type which may be readily recalibrated for use in conjunction with differing workpieces and/or gage masters.

The invention, together with additional objects, features and advantages thereof, will be best understood from the following description, the appended claims and the accompanying drawings in which:

FIGS. 1–4 together comprise an electrical schematic diagram of a presently preferred embodiment of the control system and method in accordance with the invention.

Referring to the drawings, a grinding wheel 20 (FIG. 1) is mounted on a wheelslide 22 which is coupled to a hydraulic cylinder 24 and to a wheelslide motor drive system 26 for controlled reciprocal motion into and out of engagement with a workpiece 28. Cylinder 24 is coupled by a valve 30 to a hydraulic fluid source 32. A valve control circuit 34 is connected to valve 30. A gage 36 has a pair of caliper arms 38 which engage workpiece 28 during machining thereof so as to provide an electrical output signal to the non-inverting input of a differential amplifier 40 (FIG. 2) as a function of workpiece size. In the specific embodiment illustrated in the drawings, the electrical output of gage 36 varies as a direct linear function of workpiece diameter. The inverting input of amplifier 40 is connected through the normally closed contacts of a relay switch 42 to the output of an amplifier 44. The input of amplifier 44 is connected to the wiper of an adjustable resistor 46. The output of amplifier 40 is connected to the non-inverting input of an amplifier 48, which has an output connected to an analog meter 50 and to the inverting inputs of the differential amplifiers 52, 54, 56 and 58 (FIG. 1). The non-inverting inputs of amplifiers 52–58 are each connected to the wiper of an associated adjustable resistor 60, 62, 64 and 66. An enable switch 68, which may comprise a set of normally open contacts associated with circuitry for enabling operation of the grinding machine tool (not shown), connects a source of electrical power through a delay circuit 70 to one side of the coils 72, 74, 76 and 78 respectively operatively associated with the relay switches 80, 82, 84 and 86. The other terminal of each relay coil 72–78 is connected to the output of an associated amplifier 52–58. The common contacts of relay switches 80–84 are connected to ground, and the normally open contacts thereof are connected to the control inputs of wheelslide motor drive system 26. The normally open contact of relay switch 86 is also connected to valve control circuit 34.

In general operation, with wheelslide 22 in the retracted position (not shown), a workpiece is mounted in position and gage caliper arms 38 are placed in engagement therewith. The machining operation is then initiated by closure of switch 68, which applies power to the coils of relay coils 80–86. Initially, workpiece 28 is much larger than the final desired size, so that the output of gage 36 to amplifier 40 is at a relatively high level. Resistor 46 is preadjusted during a setup operation to provide an offset voltage through relay switch 42 to the inverting input of amplifier 40 so that the output thereof at the final desired machined size of workpiece 28 is at substantially zero voltage level. Thus, with workpiece 28 being initially oversized, the output of amplifier 40 is initially at a high level, all amplifiers 52–58 have a high voltage output, and the switches of relays 80–86 are all closed so as to provide a ground signal to the associated inputs of wheelslide motion drive system 26. Valve control circuit 34 is actuated by relay switch 86 so as to feed wheelslide 22 rapidly into proximity with workpiece 28. Thereafter, motion of the wheelslide into engagement with the workpiece is controlled by wheelslide motor drive system 76.

As the grinding operation proceeds, the diameter of workpiece 28 progressively decreases. Resistors 60–64 are preadjusted during setup so that amplifiers 52–56 turn off at progressive stages of the grinding operation, and thus provide successive stage-control signals to wheelslide motor drive system 26. Resistor 66 is initially adjusted so that amplifier 58 turns off at approximately the final dimension of workpiece 28, whereby relay coil 78 and valve control circuit 34 are de-energized and wheelslide 22 is rapidly retracted from the workpiece by valve 24. Meter 50 (FIG. 2) provides an indication of measured workpiece size during the machining operation. The machine control system to the extent thus far described is basically similar to that illustrated in the aforementioned U.S. Pat. No. 4,238,886. The disclosure of such patent is incorporated herein by reference, and reference is made thereto for a more detailed description of gage 36 and staged operation of the wheelslide motor drive system 26.

In accordance with the present invention, the machine control system illustrated in the drawings is provided with means for in-process calibration so as to compensate for variations caused by gage wear, circuit temperature and other long term (as distinguished from transient) factors. More specifically, gage 36 (FIG. 1) is mounted on a gage slide 90 reciprocably coupled to a hydraulic cylinder 92 which is connected to source 32 and valve 30. A gage master part 94 is mounted in fixed position relative to cylinder 92 and has a size with a predetermined fixed dimensional relationship to the desired final size of a machined workpiece 28. Preferably, gage master 94 has a dimension which corresponds to the final desired dimension of workpiece 28, although this is not necessary for reasons which will become clear. Gage slide 90 is reciprocated by cylinder 92 so that gage caliper arms 38 engage workpiece 28 during the machining mode of operation wherein wheel 20 also engages the workpiece, and to engage master 94 during a calibration mode of operation wherein wheel 20 is retracted from the workpiece. In the latter mode of operation, wherein gage slide 90 is in the position partially illustrated in phantom in FIG. 1, the gage slide engages and actuates a limit switch 96 which provides a signal to the coil 98 (FIG. 2) associated with relay switch 42 to indicate a calibration mode of operation. The normally open contact of relay switch 42 is connected to the output of an amplifier 100 which has an input connected to the wiper of an adjustable resistor 102. Switch 96 is also connected to a time delay circuit 104, which has a second input connected to the wiper of an adjustable resistor 106 for adjustably varying the delay associated therewith. A switch 108 for enabling or disenabling the calibration mode of operation is connected through a reset/enable circuit 110 to time delay circuit 104 so as to enable operation of the latter only when the calibration mode of operation is selected by operator activation of switch 108.

Figure 2:
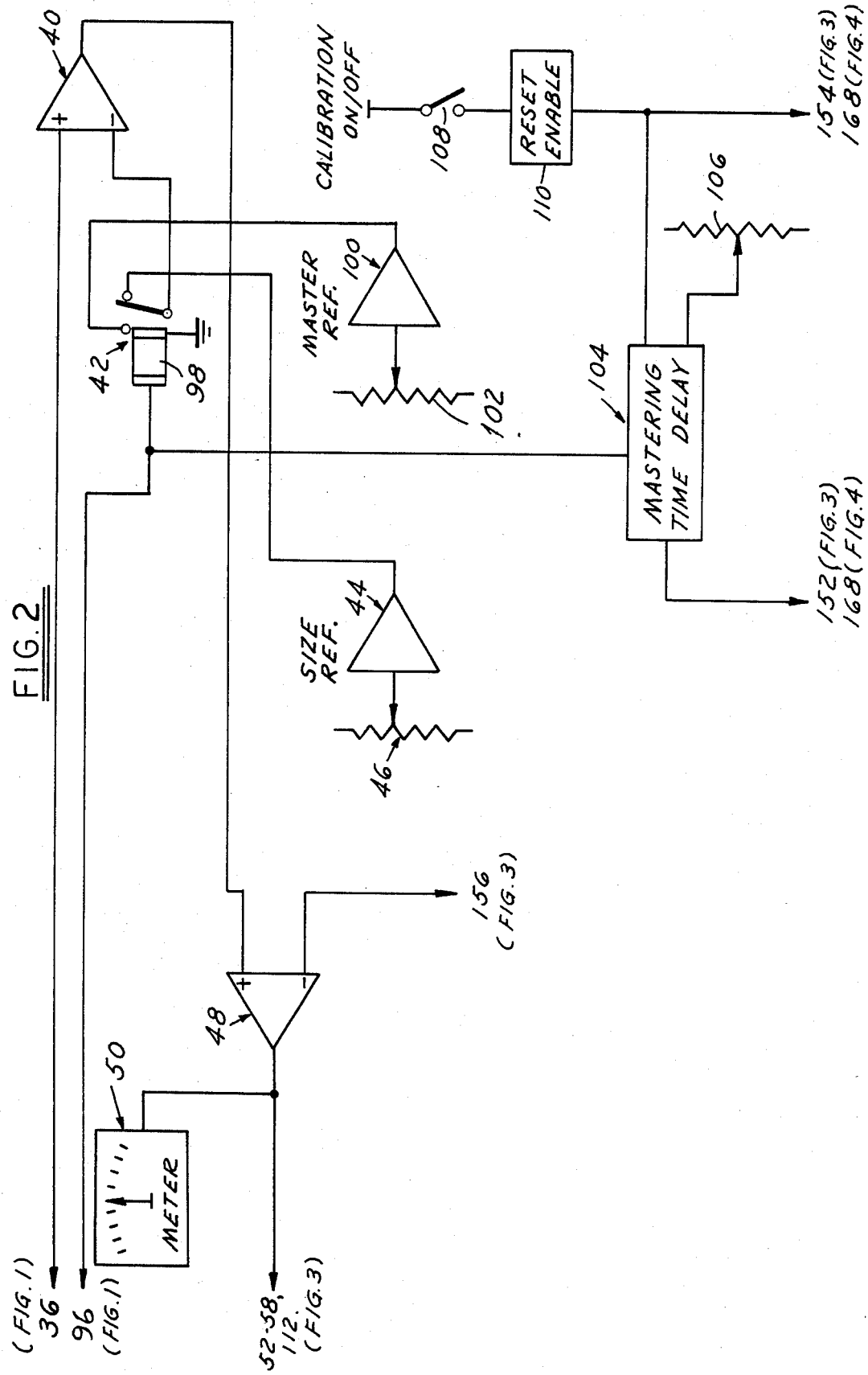
Figure 3:
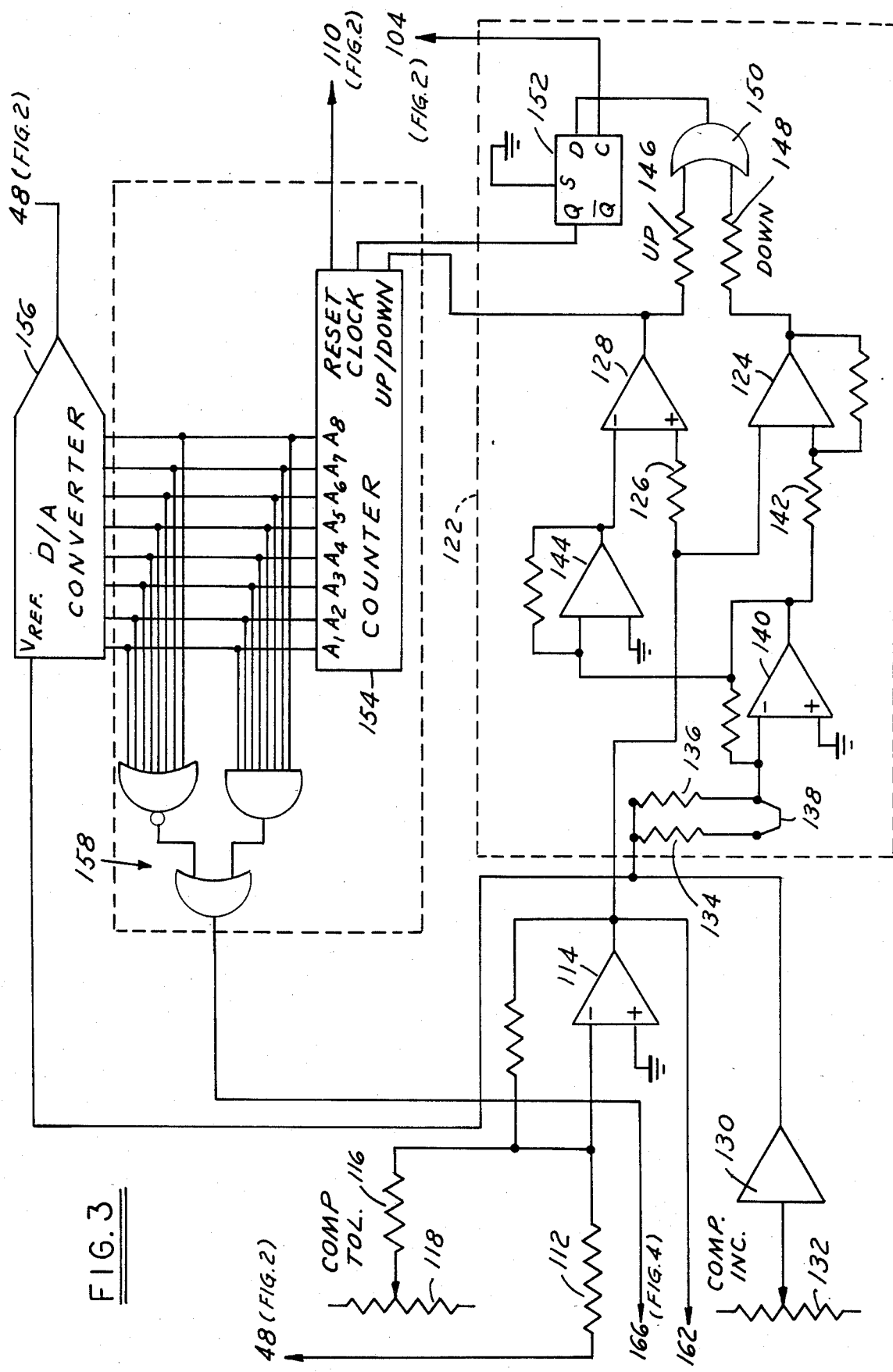

Referring now to FIG. 3, the output of differential amplifier 48 (FIG. 2) is connected through a resistor 112 to the inverting input of an amplifier 114, which input is also connected through a resistor 116 to the wiper of an adjustable resistor 118. The non-inverting input of amplifier 114 is connected to ground. The output of amplifier 114 is connected in a comparator circuit 122 to the inverting input of an amplifier 124, and through a resistor 126 to the non-inverting input of an amplifier 128. An amplifier 130 receives an input from the wiper of an adjustable resistor 132 and provides a comparator reference output voltage to the parallel resistors 134,136. The opposing ends of resistors 134,136 are connected to each other by a removable jumper 138, and resistor 136 is also connected to the inverting input of an amplifier 140. The output of amplifier 140 is connected through the resistor 142 to the non-inverting input of amplifier 124, and to the inverting input of an amplifier 144. The output of amplifier 144 is connected to the inverting input of amplifier 128. The non-inverting inputs of amplifiers 140-144 are connected to ground. The outputs of amplifiers 128,124 are connected through the respective resistors 146,148 to associated inputs of an OR-gate 150, which has an output connected to the D-input of a latch 152.

A digital up/down counter 154 has a reset input connected to reset/enable circuit 110 (FIG. 2), a clock input connected to the Q-output of latch 152, and an up/down count control input connected to the output of amplifier 128. The data outputs $A_1$ through $A_8$ of counter 154 are connected to corresponding signal inputs of a digital-to-analog converter 156. Converter 156 receives a reference voltage input from the output of amplifier 130, and provides an analog output signal to the inverting input of differential amplifier 48 which varies as a function of the digital output of counter 154. The digital outputs of counter 154 are also connected through a decoder 158 so as to provide a decoder output when the counter reaches either its maximum or minimum count.

Figure 4:
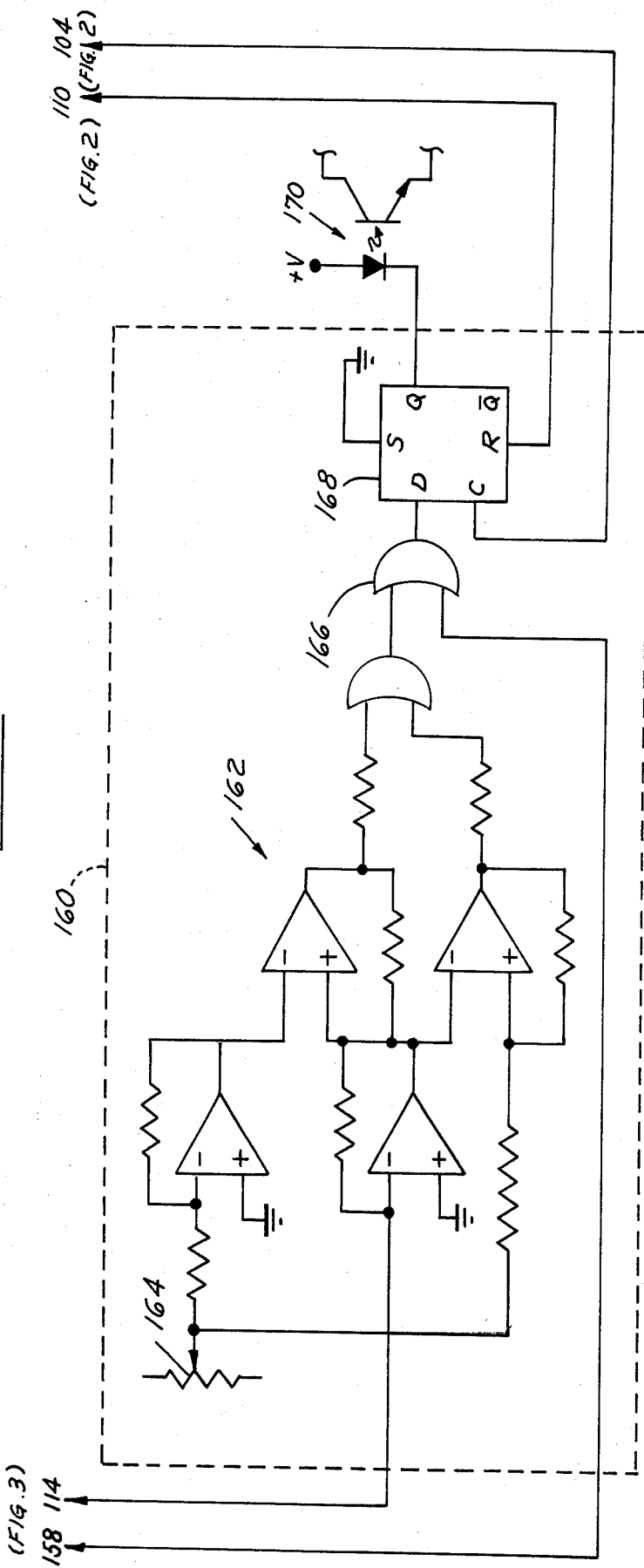

Referring now to FIG. 4, a "crash" detection circuit 160 comprises a comparator generally indicated at 162 which receives a signal input from the output of differential amplifier 48 and a reference input from the adjustable resistor 164. When the output of amplifier 48 is greater than or less than the desired gage master measurement output level by more than the amount indicated by resistor 164, comparator 162 provides an appropriate output signal to one input of the OR-gate 166. The second input of gate 166 is connected to the output of decoder 158 (FIG. 3). Thus, the output of OR-gate 166 switches to a high or logical one condition when counter 154 reaches its maximum or minimum count, or when the gage output during a particular calibration mode of operation is greater than or less than the desired output by more than the amount associated with resistor 164. The output of gate 166 is connected to the D-input of a latch 168, which receives a clock input from time delay circuit 104 (FIG. 2) and a reset input from reset/enable circuit 110. The Q-output of latch 168 is connected through an optical coupler 170 to external machine control circuitry (not shown) for inhibiting machine operation in the event of a major failure so detected.

In general, operation of the present invention hereinabove described contemplates three distinct modes of operation: an initial setup operation in which the various resistors are adjusted to establish corresponding reference voltage levels, a machining mode of operation hereinabove described in connection with FIGS. 1 and 2 wherein grinding wheel 20 engages and machines workpiece 28 under real-time control of gage 36, and a calibration mode of operation wherein gage 36 engages gage master 94 and the circuitry of FIGS. 2, 3 and 4 functions to obtain and store a signal to compensate real-time control during the machining mode of operation for variations due to gage wear and temperature, etc. During the initial setup mode of operation, calibration enable switch 108 (FIG. 2) is opened, which resets latch 168 (FIG. 4) and counter 154 (FIG. 3) and disenables delay circuit 104 (FIG. 2). The output of counter 154 is thus at the zero level, so that the analog output of converter 156 to differential amplifier 48 (FIG. 2) is correspondingly equal to zero and the output of amplifier 48 is equal to the input thereto from amplifier 40. Gage slide 90 (FIG. 1) is moved to the gage mastering or calibration position illustrated in phantom and limit switch 96 is correspondingly activated. Resistor 102 is then adjusted so that the outputs of amplifiers 40 and 48 are at the desired gage master measurement level, which preferably corresponds to the desired final size of workpiece 28 (FIG. 1). Resistor 118 (FIG. 3) is likewise adjusted so that the output of amplifier 114 to comparator 122 is at a zero level. At this point, the compensation circuitry of FIGS. 2, 3 and 4 is calibrated to gage master 94. Thus, this setup procedure is repeated each time gage master 94 is replaced, or in the event of other major rework of the machine control system. Resistor 132 is adjusted so that the output thereof to converter 156 equals one desired compensation increment. Resistor 164 (FIG. 4) is adjusted to desired "crash" detection level, and initial setup is complete. Switch 108 is then closed, so that reset/enable circuit 110 enables operation of the calibration circuitry by enabling operation of master time delay circuit 104.

Assume now that a machining operation has been completed, that wheelslide 22 has been retracted and gage slide 90 has been moved to the position indicated in phantom in FIG. 1 wherein arms 38 engage master 94 and switch 96 is closed. Closure of switch 96 energizes relay 98, so that the gage master reference signal of resistor 102 and amplifier 100 is connected to amplifier 40. Assume further that the compensation signal output of converter 156 (FIG. 3) is at the initial set-up level of zero volts, and that gage wear or temperature variations, etc. has caused the master measurement output of gage 36 to depart from the initial zero setup level. This departure, indicated at the output of amplifier 48, is fed to amplifier 114 (FIG. 3) and, if such departure exceeds the deadband established by resistor 118, the output of amplifier 114 feeds such departure to comparator circuit 122. Resistor 132 and amplifier 130 establish the analog voltage increment of the compensation signal to amplifier 48 (FIG. 2) associated with each increment or decrement of counter 54, and also sets the comparison level of comparator 22. It will be noted in particular that jumper 138 provides for selection of such comparison level, either at the voltage output of amplifier 130 when jumper 138 is removed, or at twice such voltage output when jumper 138 remains intact. When the output of amplifier 114 indicates that the measurement gage output is greater than desired, amplifier 124 in comparator 122 correspondingly indicates that downward or negative compensation is required. On the other hand, if the measurement gage output signal is low, amplifier 128 of comparator 122 indicates that upward compensation is required. In either event, OR-gate 150 provides an input to latch 152 which indicates that some compensation is required during the associated calibration cycle.

The calibration-requirement output of gate 150 is loaded into latch 152 after the time delay associated with delay circuit 104. The output of latch 152 clocks counter 154 so as to increment or decrement the count therein depending upon the signal at the up/down counter control input thereof. Thus, where the measurement gage output is too low, indicating that upward correction is required, the output of amplifier 128 will be high and a clock input to counter 154 from latch 152 increments the count therein, thereby increasing the data signal to D/A converter 156. Such counter incrementation increases the analog voltage to the inverting input of differential amplifier 48 (FIG. 2) by the amount of the voltage reference input to the converter from amplifier 130. On the other hand, when the measurement gage signal is too high, indicating that downward compensation is required, the output of amplifier 128 will remain low so that a clock input from latch 152 decrements counter 154 and the analog output of converter 156 decreases by an amount equal to the value of the voltage reference input. Thus, the analog compensation signal from converter 156 to amplifier 48 (FIG. 2) is incremented or decremented by a predetermined amount during each mastering or calibration cycle if correction is required. If the output of the measurement gage during the calibration cycle departs substantially from the desired output (but is not sufficient to activate the crash detection circuit of FIG. 4), several compensation cycles may be required in order to establish a compensation signal to amplifier 48 necessary to return the output thereof to the desired level.

Thus, the gage master measurement signal is subtracted during the calibration mode of operation from the gage master reference signal by amplifier 40. The resulting difference is employed to increment or decrement the calibration signal to amplifier 48 if needed. Thereafter, during the machining mode of operation, the calibration signal is added by amplifier 48 to the workpiece measurement signal, and machine tool motion is controlled accordingly.

Turning now to FIG. 4, a major departure of the gage measurement signal during the calibration mode of operation, which may result for example from a caliper arm being broken during use, causes the input to circuit 160 from amplifier 114 to exceed the level set by resistor 166. Comparator 162 will then cause latch 168 to be set upon receipt of a delayed latch clock input from time delay circuit 104. Crash detect latch 168 will also be set in the event that the compensation signal to amplifier 48 reaches either the positive or negative compensation limit, which event will be detected by decoder 158 and fed by the output thereof to gate 166. In either event, coupler 170 shuts down operation of the grinding machine until such time that appropriate operator intervention has taken place and the control circuit has been reset by opening and closing switch 108 (FIG. 2).

The invention claimed is:

1. A system for controlling operation of a machine tool for removing stock from a workpiece comprising
   - gage means including a measurement gage and means for positioning said gage in engagement with a workpiece during machining thereof so as to provide a workpiece measurement signal as a function of dimensions of the workpiece,
   - means for varying engagement of the machine tool with the workpiece, including means for controlling such engagement in real time as a function of a control signal,
   - gage master means including a gage master having a predetermined fixed dimension relative to desired machined dimensions of the workpiece and means for positioning said gage in engagement with said gage master so as to provide a gage master measurement signal as a function of dimensions of said gage master, and
   - compensation means comprising first circuit means for generating and storing a compensation signal as a function of a difference between said gage master measurement signal and said predetermined fixed dimension of said gage when said gage is engaged with said gage master, and second circuit means for providing said control signal to said controlling means when said gage is engaged with a workpiece as a combined function of said workpiece measurement signal and said compensation signal.

2. The system set forth in claim 1 wherein said gage positioning means comprises means operable during a first mode of operation for positioning said gage in engagement with said gage master and means operable during a second mode of operation distinct from said first mode for positioning said gage in engagement with said workpiece, wherein said first circuit means includes means operable during said first mode of operation to obtain and store said compensation signal, and wherein said second circuit means includes means operable during said second mode of operation to provide said control signal to said controlling means.

3. The system set forth in claim 2 wherein said first circuit means comprises first reference circuit means for providing a first reference signal as a function of said predetermined dimension, and first comparison circuit means operable during said first mode of operation for providing a first difference signal as a function of a difference between said first reference signal and said gage master measurement signal.

4. The system set forth in claim 3 wherein said first comparison circuit means further includes means operable during said first mode of operation for indicating polarity of said first difference signal.

5. The system set forth in claim 4 wherein said first circuit means further comprises second reference circuit means for providing a difference threshold reference signal, and second comparison circuit means operable during said first mode of operation to provide a second difference signal only when said first difference signal exceeds said threshold.

6. The system set forth in claim 4 wherein said first circuit means includes means operable during said first mode of operation for varying magnitude and polarity of said compensation signal as a function of magnitude and polarity of said first difference signal.

7. The system set forth in claim 6 wherein said first circuit means includes means for varying magnitude and polarity of said compensation signal by a predetermined fixed amount during each said first mode of operation as a function of said first difference signal.

8. The system set forth in claim 7 wherein said first circuit means comprises digital up/down counter means and means responsive to said first comparison circuit means for selectively incrementing or decrementing said up/down counter means during said first mode of operation as a function of said magnitude and polarity of said first difference signal.

9. The system set forth in claim 8 wherein said first circuit means further comprises digital-to-analog converter means for providing said compensation signal as a function of the digital output of said counter means, and wherein said second circuit means comprises differential amplifier means having a first input connected to receive said workpiece measurement signal in said second mode of operation, a second input connected to receive said compensation signal, and an output connected to provide said control signal to said controlling means.

10. The system set forth in claim 9 further comprising means for selectively controlling the magnitude of variation of said compensation signal associated with each said increment and decrement of said counter means.

11. The system set forth in claim 4 further comprising means operable during a third mode of operation for selectively adjusting said first reference signal.

12. A system for grinding workpieces to preselected size comprising grinding means including a wheelslide having a grinding wheel mounted thereon and means coupled to said wheelslide for advancing said wheel into grinding engagement with a workpiece, gage means including a gage having a pair of caliper arms and an output which varies with position of said arms, and means for positioning said gage with said arms in engagement with a workpiece so as to provide a said output indicative of workpiece size, a gage master having a predetermined fixed size relative to said preselected size, said positioning and advancing means being operable during a first mode of operation to position said gage arm in engagement with said gage master, and during said second mode of operation to position said gage arm in engagement with a workpiece and to advance said wheel into grinding engagement with the workpiece, compensation circuit means coupled to said gage means and comprising first reference means for establishing a reference signal indicative of said predetermined fixed size of said gage master, and means coupled to said gage means and to said first reference circuit means and operable during said first mode of operation to provide a compensation signal which varies as a function of a difference between said gage output and said reference signal, and means coupled to said gage means, to said compensation circuit means and to said advancing means to control operation of said advancing means during said second mode of operation as a combined function of said gage output and said compensation signal.

13. In a machining operation wherein engagement of a machine tool with a workpiece is controlled in real time by a workpiece measurement signal from a gage likewise engaged with the workpiece, a method of calibrating said workpiece measurement signal for variations due to gage wear, temperature and the like comprising the steps of:

(a) providing a gage master having predetermined master dimensions relative to desired machined size of said workpiece, (b) periodically bringing said gage into measuring engagement with said gage master to provide a gage master measurement signal, (c) providing a compensation signal as a function of a difference between said gage master measurement signal and said predetermined master dimensions, and (d) thereafter controlling operation of said machine tool as a combined function of said workpiece measurement signal and said compensation signal.

14. The method set forth in claim 13 wherein said step (c) comprises the steps of:

(c1) providing a gage master reference signal indicative of said predetermined master dimensions, and (c2) comparing said gage master measurement signal to said gage master reference signal to provide said compensation signal.

15. The method set forth in claim 14 wherein said step (c2) comprises the steps of: (c2i) subtracting said gage master measurement signal from said gage master reference signal to provide a said difference signal, and (c2ii) developing said compensation signal as a function of magnitude and polarity of said difference signal, and wherein said step (d) comprises the step of adding said compensation signal to said workpiece measurement signal to provide a compensated workpiece measurement signal indicative of actual workpiece dimension.

16. The method set forth in claim 15 wherein said step (c2) is carried out during a first mode of operation and comprises the step of selectively incrementing or decrementing a stored signal as a function of magnitude and polarity of said difference signal, said step (d) being carried out in a second mode of operation distinct from said first mode of operation.

17. The method set forth in claim 16 wherein said step (c2) comprises the step of selectively incrementing or decrementing said stored signal by a predetermined amount and as a function of said polarity whenever said magnitude exceeds a predetermined threshold.

18. The method set forth in claim 17 comprising the further step during a third mode of operation of selectively adjusting said master gage reference signal.

* * * * *